United States Patent
Maruyama et al.

[19]

[11] Patent Number: 6,144,737
[45] Date of Patent: Nov. 7, 2000

[54] TRUNK INTERFACE CIRCUIT HAVING FUNCTION OF BATTERY FEED TO CENTRAL OFFICE

[75] Inventors: Kenichi Maruyama; Masami Nashirozawa, both of Yokohama, Japan

[73] Assignee: Matsushita Electric Industrial Co., Ltd., Osaka, Japan

[21] Appl. No.: 09/037,996

[22] Filed: Mar. 11, 1998

[30] Foreign Application Priority Data

Jun. 19, 1997 [JP] Japan ................................ 9-178974

[51] Int. Cl.⁷ .................................................. H04M 19/00
[52] U.S. Cl. ......................... 379/413; 379/324; 379/322; 379/231; 379/323; 361/119
[58] Field of Search ............................. 361/119; 379/324, 379/413, 322, 323, 231

[56] References Cited

U.S. PATENT DOCUMENTS

| | | | |
|---|---|---|---|
| 4,056,689 | 11/1977 | Freimanis | 379/413 |
| 4,414,435 | 11/1983 | Parlor | 379/398 |
| 4,679,232 | 7/1987 | Brooks et al. | |
| 4,742,538 | 5/1988 | Szlam | 379/361 |
| 4,742,539 | 5/1988 | Szlam | 379/377 |
| 4,924,497 | 5/1990 | Smith et al. | 379/150 |
| 4,942,604 | 7/1990 | Smith et al. | 379/412 |
| 5,138,658 | 8/1992 | Carter et al. | 379/413 |
| 5,854,839 | 12/1998 | Chen et al. | 379/413 |
| 5,881,129 | 12/1998 | Chen et al. | 379/5 |

*Primary Examiner*—Richemond Dorvil
*Assistant Examiner*—Vijay B Chawan
*Attorney, Agent, or Firm*—Pollock, Vande Sande & Amernick, R.L.L.P.

[57] ABSTRACT

A telephone-system interface circuit connected to a central office via a tip line and a ring line includes a battery having a first terminal and a second terminal. A first current control circuit is connected between the tip line and the first terminal of the battery. A second current control circuit is connected between the ring line and the second terminal of the battery. The first current control circuit and the second current control circuit are equal in structure.

3 Claims, 1 Drawing Sheet

TRUNK INTERFACE CIRCUIT HAVING FUNCTION OF BATTERY FEED TO CENTRAL OFFICE

BACKGROUND OF THE INVENTION

1. Field of the Invention

This invention relates to an interface circuit for a private branch exchange, a key telephone system, or others which has a function of battery feed to a central office in a telephone network.

2. Description of the Related Art

In telecommunications, electric power is consumed by the transmission of an address signal from a telephone set to a central office, the generation of a ringing tone in the telephone set, and the voice communication between the telephone set and the central office. Generally, such electric power is derived from a dc power source or a battery located in the central office which is referred to as a common battery. Thus, in this case, a battery current for the voice communication is fed from the central office toward the telephone set.

According to special standards for telephone networks, a private branch exchange or a key telephone system is required to have a function of feeding a battery current for voice communication toward a central office. Therefore, the private branch exchange or the key telephone system has an interface circuit for implementing the feed of a voice communication current toward the central office. Such an interface circuit of a prior-art type tends to be affected by common-mode noise.

SUMMARY OF THE INVENTION

It is an object of this invention to provide an improved interface circuit for a private branch exchange, a key telephone system, or others.

A first aspect of this invention provides a telephone-system interface circuit connected to a central office via a tip line and a ring line, comprising a battery having a first terminal and a second terminal; a first current control circuit connected between the tip line and the first terminal of the battery; and a second current control circuit connected between the ring line and the second terminal of the battery; wherein the first current control circuit and the second current control circuit are equal in structure.

A second aspect of this invention is based on the first aspect thereof, and provides a telephone-system interface circuit wherein the first and second current control circuits comprise first and second constant-current circuits respectively.

A third aspect of this invention is based on the first aspect thereof, and provides a telephone-system interface circuit wherein each of the first and second current control circuits comprises first and second resistors, and first and second transistors, wherein a first end of the first resistor is connected to a collector of the first transistor and a base of the second transistor, and a second end of the first resistor is connected to a collector of the second transistor, wherein a first end of the second resistor is connected to a base of the first transistor and an emitter of the second transistor, and a second end of the second resistor is connected to an emitter of the first transistor.

DESCRIPTION OF THE PREFERRED EMBODIMENT

Figure 1:
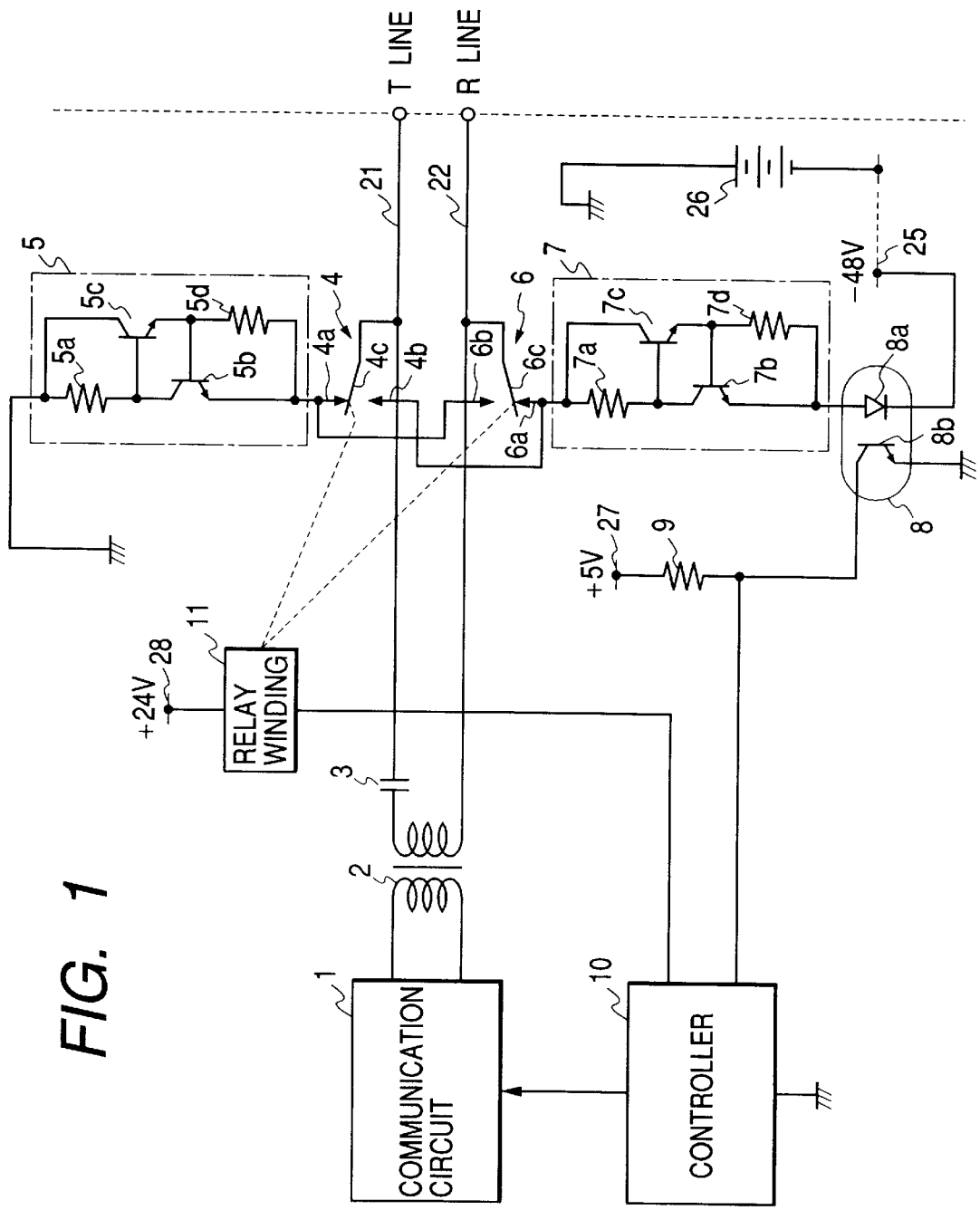
FIG. 1 is a diagram of a trunk interface circuit according to an embodiment of this invention.

FIG. 1 shows a trunk interface circuit according to an embodiment of this invention. The trunk interface circuit of FIG. 1 is provided in a private exchange, a key telephone system, or others.

The trunk interface circuit of FIG. 1 includes a conventional communication circuit 1 connected to a primary winding of an insulation transformer or a dc-isolation transformer 2. A first end of a secondary winding of the transformer 2 is connected via a de-cutting capacitor or a decoupling capacitor 3 to a tip line (a T line) 21. A second end of the secondary winding of the transformer 2 is connected to a ring line (an R line) 22. The T line 21 and the R line 22 form a pair of communication lines or telephone lines extending from a central office (not shown). Thus, the T line 21 and the R line 22 form a part of a loop extending between the trunk interface circuit and the central office.

The trunk interface circuit of FIG. 1 includes a relay having switches 4 and 6 and a control winding 11. The relay switch 4 includes fixed contacts 4a and 4b and a movable contact 4c. When the relay winding 11 is de-energized, the movable contact 4c of the relay switch 4 is connected to the fixed contact 4a thereof and is disconnected from the fixed contact 4b thereof. When the relay winding 11 is energized, the movable contact 4c of the relay switch 4 is connected to the fixed contact 4b thereof and is disconnected from the fixed contact 4a thereof. Similarly, the relay switch 6 includes fixed contacts 6a and 6b, and a movable contact 6c. When the relay winding 11 is de-energized, the movable contact 6c of the relay switch 6 is connected to the fixed contact 6a thereof and is disconnected from the fixed contact 6b thereof. When the relay winding 11 is energized, the movable contact 6c of the relay switch 6 is connected to the fixed contact 6b thereof and is disconnected from the fixed contact 6a thereof.

The movable contact 4c of the relay switch 4 is connected to the T line 21. The fixed contact 4a of the relay switch 4, and the fixed contact 6b of the relay switch 6 are grounded via a current control circuit 5. The movable contact 6c of the relay switch 6 is connected to the R line 21. The fixed contact 4b of the relay switch 4, and the fixed contact 6a of the relay switch 6 are connected via a current control circuit 7 to the anode of a light emitting diode 8a in a photocoupler 8. The cathode of the light emitting diode 8a in the photocoupler 8 is connected to a negative voltage line 25 leading to the negative terminal of a battery or a dc power source 26. The positive terminal of the battery 26 is grounded. The battery 26 applies a voltage of, for example, −48 V to the negative voltage line 25.

The photocoupler 8 includes a phototransistor 8b designed to respond to light outputted from the light emitting diode 8a. The collector of the phototransistor 8b is connected via a resistor 9 to a positive voltage line 27 subjected to a positive potential of, for example, +5 V relative to the ground. The resistor 9 implements a pull-up function. The emitter of the phototransistor 8b is grounded.

The trunk interface circuit of FIG. 1 includes a controller 10 connected to the communication circuit 1. The controller 10 has a first terminal which is grounded. The controller 10 has a second terminal which is connected via the relay winding 11 to a positive voltage line 28 subjected to a positive potential of, for example, +24 V relative to the ground. The controller 10 has a third terminal connected to the junction between the resistor 9 and the collector of the phototransistor 8b in the photocoupler 8.

The controller 10 has a function of selectively shunting and disconnecting the connection line, which extends from the relay winding 11, to and from the ground. When the controller 10 shunts the relay connection line to the ground, the relay winding 11 is energized by a current fed via the positive voltage line 28. When the controller 10 disconnects the relay connection line from the ground, the relay winding 11 is de-energized. Thus, the controller 10 has a function of selectively energizing and de-energizing the relay winding 11.

In the photocoupler 8, the light emitting diode 8a outputs light in response to a current flowing therethrough. The intensity of light outputted from the light emitting diode 8a depends on the magnitude of the current flowing therethrough. The phototransistor 8b is exposed to the light outputted from the light emitting diode 8a. The resistance between the collector and the emitter of the phototransistor 8b varies as a function of the intensity of light outputted from the light emitting diode 8a. Thus, a current which flows from the positive voltage line 27 to the ground via the resistor 9 and the collector-emitter path of the phototransistor 8b depends on the intensity of light outputted from the light emitting diode 8a. Accordingly, the voltage at the junction between the resistor 9 and the collector of the phototransistor 8b varies in accordance with the current through the light emitting diode 8a. In other words, the voltage at the junction between the resistor 9 and the collector of the phototransistor 8b represents the current through the light emitting diode 8a.

As previously indicated, the controller 10 is connected to the junction between the resistor 9 and the collector of the phototransistor 8b. Thus, the controller 10 receives the voltage at the junction between the resistor 9 and the collector of the phototransistor 8b. The controller 10 derives information of the current through the light emitting diode 8a from the voltage at the the junction between the resistor 9 and the collector of the phototransistor 8b.

The current control circuits 5 and 7 are the same in internal design or structure. Each of the current control circuits 5 and 7 includes a constant-current circuit or a current limiter.

The current control circuit 5 has resistors 5a and 5d, and NPN transistors 5b and 5c. A first end of the resistor 5a is connected to the collector of the transistor 5c. The junction between the first end of the resistor 5a and the collector of the transistor 5c is grounded. A second end of the resistor 5a is connected to the base of the transistor 5c and the collector of the transistor 5b. The emitter of the transistor 5c is connected to a first end of the resistor 5d. The base of the transistor 5b is connected to the junction between the emitter of the transistor 5c and the first end of the resistor 5d. The emitter of the transistor 5b is connected to a second end of the resistor 5d. The junction between the emitter of the transistor 5b and the second end of the resistor 5d is connected to the fixed contact 4a of the relay switch 4 and also the fixed contact 6b of the relay switch 6.

The current control circuit 7 has resistors 7a and 7d, and NPN transistors 7b and 7c. A first end of the resistor 7a is connected to the collector of the transistor 7c. The junction between the first end of the resistor 7a and the collector of the transistor 7c is connected to the fixed contact 4b of the relay switch 4 and also the fixed contact 6a of the relay switch 6. A second end of the resistor 7a is connected to the base of the transistor 7c and the collector of the transistor 7b. The emitter of the transistor 7c is connected to a first end of the resistor 7d. The base of the transistor 7b is connected to the junction between the emitter of the transistor 7c and the first end of the resistor 7d. The emitter of the transistor 7b is connected to a second end of the resistor 7d. The junction between the emitter of the transistor 7b and the second end of the resistor 7d is connected to the anode of the light emitting diode 8a in the photocoupler 8.

Operation of the trunk interface circuit of FIG. 1 can be changed among different modes including an idle mode (a stand-by mode) and a communication mode (a talk mode). The controller 10 includes, for example, a microcomputer or a CPU which operates according to a program stored in its internal ROM. The program is designed to implement processes which will be indicated later.

During the idle mode of operation of the trunk interface circuit, the controller 10 continues to de-energize the relay winding 11. Thus, the movable contact 4c of the relay switch 4 remains connected to the fixed contact 4a thereof. In addition, the movable contact 6c of the relay switch 6 remains connected to the fixed contact 6a thereof. Accordingly, during the idle mode of operation of the trunk interface circuit, the T line 21 is connected to the positive terminal of the battery 26 via the relay switch 4, the current control circuit 5, and the ground while the R line 22 is connected to the negative terminal of the battery 26 via the relay switch 6, the current control circuit 7, and the light emitting diode 8a of the photocoupler 8.

A loop which includes the T line 21 and the R line 22 extends between the trunk interface circuit and the central office. The battery 26 is interposed in the loop. When the loop is closed, the battery 26 drives a current through the loop. Thus, the battery 26 can feed electric power used in communication between the trunk interface circuit and the central office. When the loop is substantially opened, the feed of the electric power from the battery 26 is interrupted.

During the idle mode of operation of the trunk interface circuit, when an incoming call signal is transmitted from the central office to the trunk interface circuit, a current corresponding to the incoming call signal flows from the R line 22 to the T line 21 via the relay switch 6, the current control circuit 7, the light emitting diode 8a, the battery 26, the ground, the current control circuit 5, and the relay switch 4. This current is generated by the battery 26. Since the voltage at the junction between the resistor 9 and the collector of the phototransistor 8b depends on the current through the light emitting diode 8a, the incoming call signal is induced at the junction between the resistor 9 and the collector of the phototransistor 8b. Then, the call incoming signal is fed to the controller 10. In this way, the controller 10 is informed of the arrival of the call incoming signal. The controller 10 implements a process of enabling the generation of a ringing tone in response to the call incoming signal.

When one extension connected to the trunk interface circuit responds to the call incoming signal, the extension informs the controller 10 of its response, that is, "off-hook". Then, the controller 10 informs the central office of "off-hook" and changes operation of the trunk interface circuit to the communication mode (the talk mode). Specifically, the controller 10 energizes the relay winding 11. Therefore, the movable contact 4c of the relay switch 4 is disconnected from the fixed contact 4a thereof and is connected to the fixed contact 4b thereof. In addition, the movable contact 6c of the relay switch 6 is disconnected from the fixed contact 6a thereof and is connected to the fixed contact 6b thereof. Accordingly, the T line 21 is connected to the negative terminal of the battery 26 via the relay switch 4, the current control circuit 7, and the light emitting diode 8a of the photocoupler 8 while the R line 22 is connected to the positive terminal of the battery 26 via the relay switch 6, the current control circuit 5, and the ground. Thus, the polarity of the electric potential between the T line 21 and the R line 22 is inverted or reversed. The central office is informed of the polarity inversion as an indication of "off-hook". It should be noted that the polarity inversion is implemented by energizing the relay winding 11. During the communication mode (the talk mode) of operation of the trunk interface circuit, the T line 21 remains connected to the negative terminal of the battery 26 while the R line 22 remains connected to the positive terminal of the battery 26.

During the communication mode (the talk mode) of operation of the trunk interface circuit, an outgoing talk signal is transmitted from the communication circuit 1 to the pair of the T line 21 and the R line 22 via the transformer 2 and the capacitor 3. In addition, an incoming talk signal is transmitted from the pair of the T line 21 and the R line 22 to the communication circuit 1 via the capacitor 3 and the transformer 2. During the communication mode (the talk mode) of operation of the trunk interface circuit, a current flows from the positive terminal of the battery 26 to the negative terminal thereof via the ground, the current control circuit 5, the relay switch 6, the R line 22, the central office, the T line 21, the relay switch 4, the current control circuit 7, and the light emitting diode 8a. The outgoing talk signal and the incoming talk signal are superimposed on this current. This current is referred to as the talk current.

During the communication mode (the talk mode) of operation of the trunk interface circuit, when the central office ends communication with the trunk interface circuit and substantially opens the loop between the central office and the trunk interface (circuit, the talk current through the light emitting diode 8a is cut off. The voltage at the junction between the resistor 9 and the collector of the phototransistor 8b varies in accordance with the cutoff of the talk current. Thus, the controller 10 is informed by this voltage that the central office ends communication with the trunk interface circuit. The controller 10 de-energizes the relay winding 11 to return operation of the trunk interface circuit to the idle mode when being informed that the central office ends communication with the trunk interface circuit.

During the communication mode (the talk mode) of operation of the trunk interface circuit, when the extension ends communication with the central office and falls into an on-hook state, the extension informs the controller 10 of the communication end. The controller 10 de-energizes the relay winding 11 in response to the communication end, thereby returning operation of the trunk interface circuit to the idle mode.

In the trunk interface circuit of FIG. 1, the current control circuits 5 and 7 are equal in structure. The resistor 5a in the current control circuit 5 and the resistor 7a in the current control circuit 7 use same parts having equal resistances. The transistor 5b in the current control circuit 5 and the transistor 7b in the current control circuit 7 use same parts having equal characteristics. The transistor 5c in the current control circuit 5 and the transistor 7c in the current control circuit 7 use same parts having equal characteristics. The resistor 5d in the current control circuit 5 and the resistor 7d in the current control circuit 7 use same parts having equal resistances. Accordingly, the current control circuits 5 and 7 provide a good balance between the T line 21 and the R line 22 with respect to the ground. Thus, the trunk interface circuit of FIG. 1 is less affected by common-mode noise inputted along the T line 21 and the R line 22.

What is claimed is:

1. A telephone-system interface circuit connected to a central office via a tip line and a ring line, comprising:

a battery having a first terminal and a second terminal;

a first current control circuit connected between the tip line and the first terminal of the battery; and a second current control circuit connected between the ring line and the second terminal of the battery;

wherein the first current control circuit and the second current control circuit are equal in structure.

2. A telephone-system interface circuit as recited in claim 1, wherein the first and second current control circuits comprise first and second constant-current circuits respectively.

3. A telephone-system interface circuit as recited in claim 1, wherein each of the first and second current control circuits comprises first and second resistors, and first and second transistors, wherein a first end of the first resistor is connected to a collector of the first transistor and a base of the second transistor, and a second end of the first resistor is connected to a collector of the second transistor, wherein a first end of the second resistor is connected to a base of the first transistor and an emitter of the second transistor, and a second end of the second resistor is connected to an emitter of the first transistor.

* * * * *